May 8, 1956 J. A. GREEFKES ET AL 2,744,960

TIME-MULTIPLEX PULSE-CODE MODULATION SIGNAL-TRANSMISSION SYSTEM

Filed May 9, 1951 3 Sheets-Sheet 1

INVENTORS
JOHANNES ANTON GREEFKES
PIET VAN TILBURG

BY [signature]

AGENT

INVENTORS
JOHANNES ANTON GREEFKES
PIET VAN TILBURG
BY [signature]
AGENT

INVENTORS
JOHANNES ANTON GREEFKES
PIET VAN TILBURG
BY [signature]
AGENT

United States Patent Office 2,744,960

Patented May 8, 1956

2,744,960

TIME-MULTIPLEX PULSE-CODE MODULATION SIGNAL TRANSMISSION SYSTEM

Johannes Anton Greefkes and Piet van Tilburg, Eindhoven, Netherlands, assignors to Hartford National Bank and Trust Company, Hartford, Conn., as trustee Application May 9, 1951, Serial No. 225,314

Claims priority, application Netherlands June 23, 1950

7 Claims. (Cl. 179—15)

Figures 1, 2, 3:
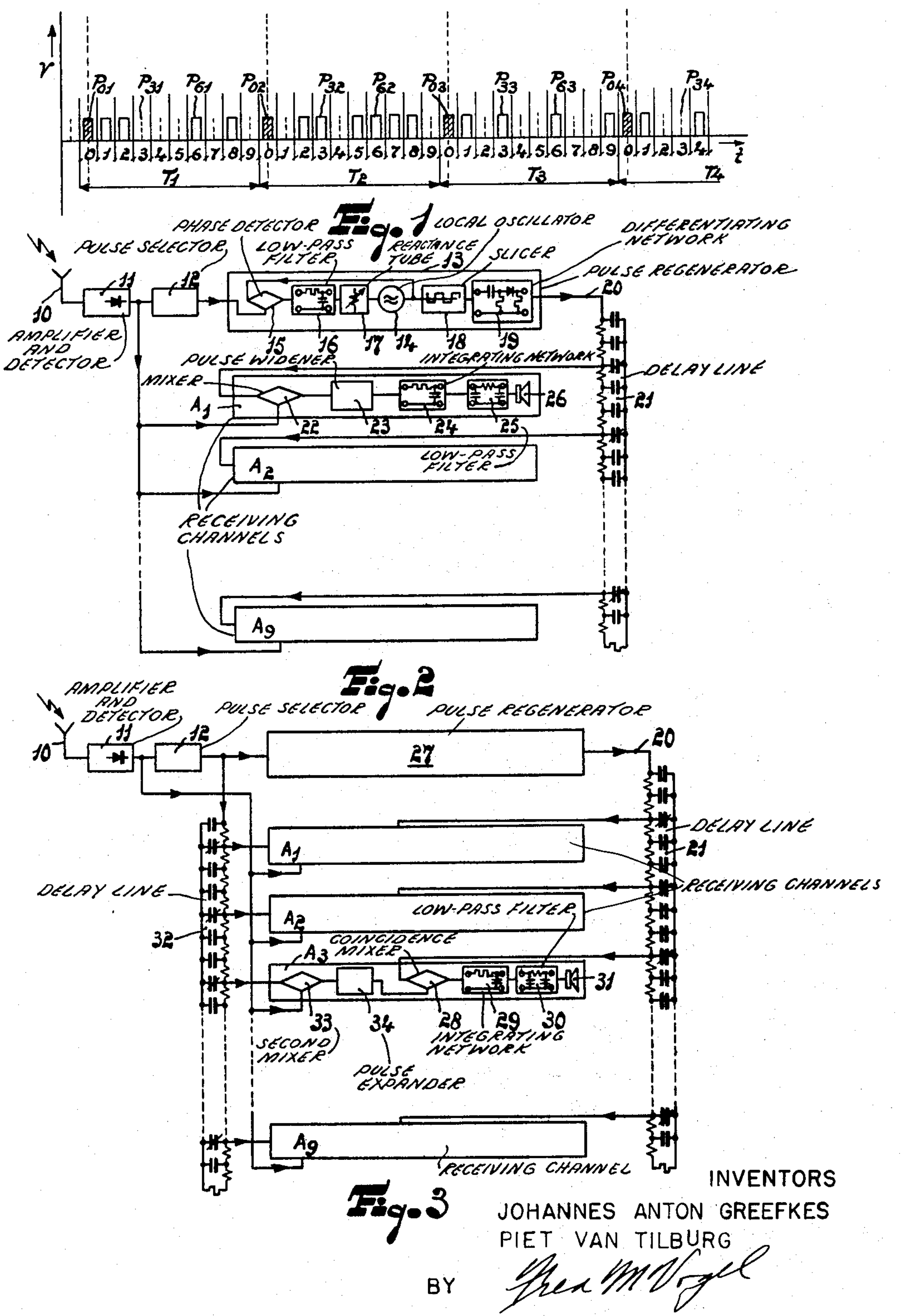

This invention relates to arrangements for regenerating in form and relative time of occurrence and for distributing in cyclic sequence signal-pulses from trains of signal-pulses, which trains are each preceded by a synchronisation pulse, at the receiving end of a time-multiplex pulse-code modulation signal-transmission system, the signal-pulses being alternatively present or absent in accordance with the signals to be transmitted.

Characteristic of such pulse-code modulation systems is inter alia the use of time quantising, i. e., at the transmitting end there are transmitted only pulses coinciding with pulses of a train of equispaced pulses. This permits at the receiving end practically complete elimination of transmission faults introduced by displacements in time of the input pulses, by means of pulse generators preceded, if desired, by amplitude threshold devices and amplitude limiting devices.

In order to regenerate incoming pulses, it is known to use at the receiver a local pulse generator producing pulses of a recurrence frequency which, by automatic frequency correction, is maintained equal to the average maximum recurrence frequency of the incoming pulses. The pulses thus produced locally are supplied to a coincidence mixer stage to which the incoming pulses, if desired after being lengthened, are also supplied. This coincidence mixer stage transmits the pulses or substitution pulses locally produced only if they coincide with incoming pulses. Hence, pulses corrected in time of occurrence replace the incoming pulses and a better signal-to-noise ratio is obtained. However, troublesome cross-talk may occur in such multiplex receivers.

The present invention has for its object to provide an improved arrangement for use in time multiplex pulse-code modulation signal transmission systems in which cross-talk between the time multiplex channels is materially reduced.

According to the invention, an arrangement for regenerating in form and time of occurrence and distributing in cyclic sequence signal-pulses from trains of signal-pulses, which trains are each preceded by a synchronisation pulse, at the receiving end of a time-multiplex pulse-code modulation signal-transmission system, the signal pulses being alternatively present or absent in accordance with the signals to be transmitted, characterized in that the incoming pulses are supplied by way of a synchronisation pulse selector to a synchronisation pulse regenerator, the output of which is coupled to the input of a first delay network, the arrangement comprising individual receiving channels each including a first coincidence mixer stage to which first coincidence mixer stages signal pulses to be regenerated are supplied, and inputs of the said first coincidence mixer stages moreover being connected each individually to different tapping points of the first delay network for the supply of substitution pulses, and the separated and regenerated signal pulses being taken from the output circuits of the first coincidence mixer stages.

In connection with the distribution of the signal pulses among the individual receiving channels in this arrangement, the variation of the phase displacement between the synchronisation pulses occurring at the input of the synchronisation pulse selector and the substantially noise-free pulses taken from the synchronisation pulse regenerator should be less than one signal interval.

To reduce the stringency of this requirement which it is difficult to fulfill in practice, the signal pulses to be regenerated and occurring in the individual receiving channels are preferably supplied to each first coincidence mixer stage through a second coincidence mixer stage, to which second coincidence mixer stages the incoming pulses are supplied in parallel, and inputs of the second coincidence mixer stages are each individually connected to different tapping points of a second delay network connected to the output of the synchronisation pulse selector.

In order to reduce the synchronisation pulse noise use may then be made of a crystal filter, if desired in combination with a simple, automatically controlled phase corrector, even if a comparatively great variation of the recurrence frequency of the synchronisation pulses is to be allowed for at the transmitting end.

Figure 4:
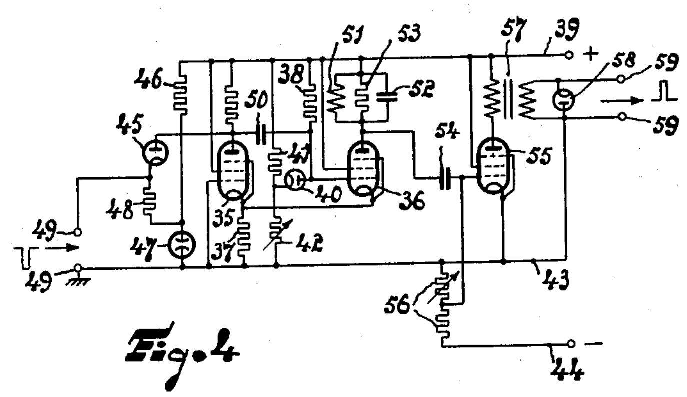
Figure 5:
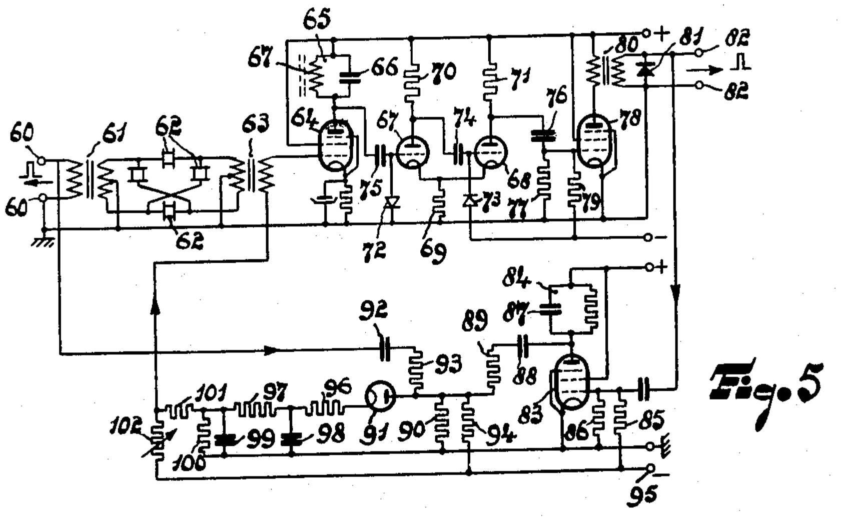
Figure 6:
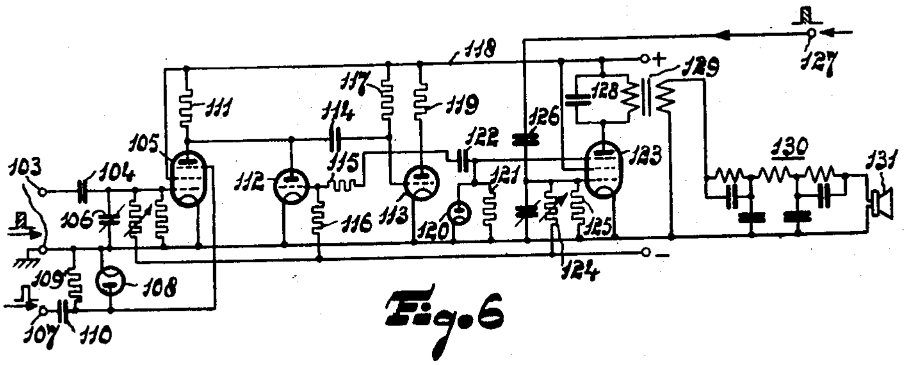
Figure 7:
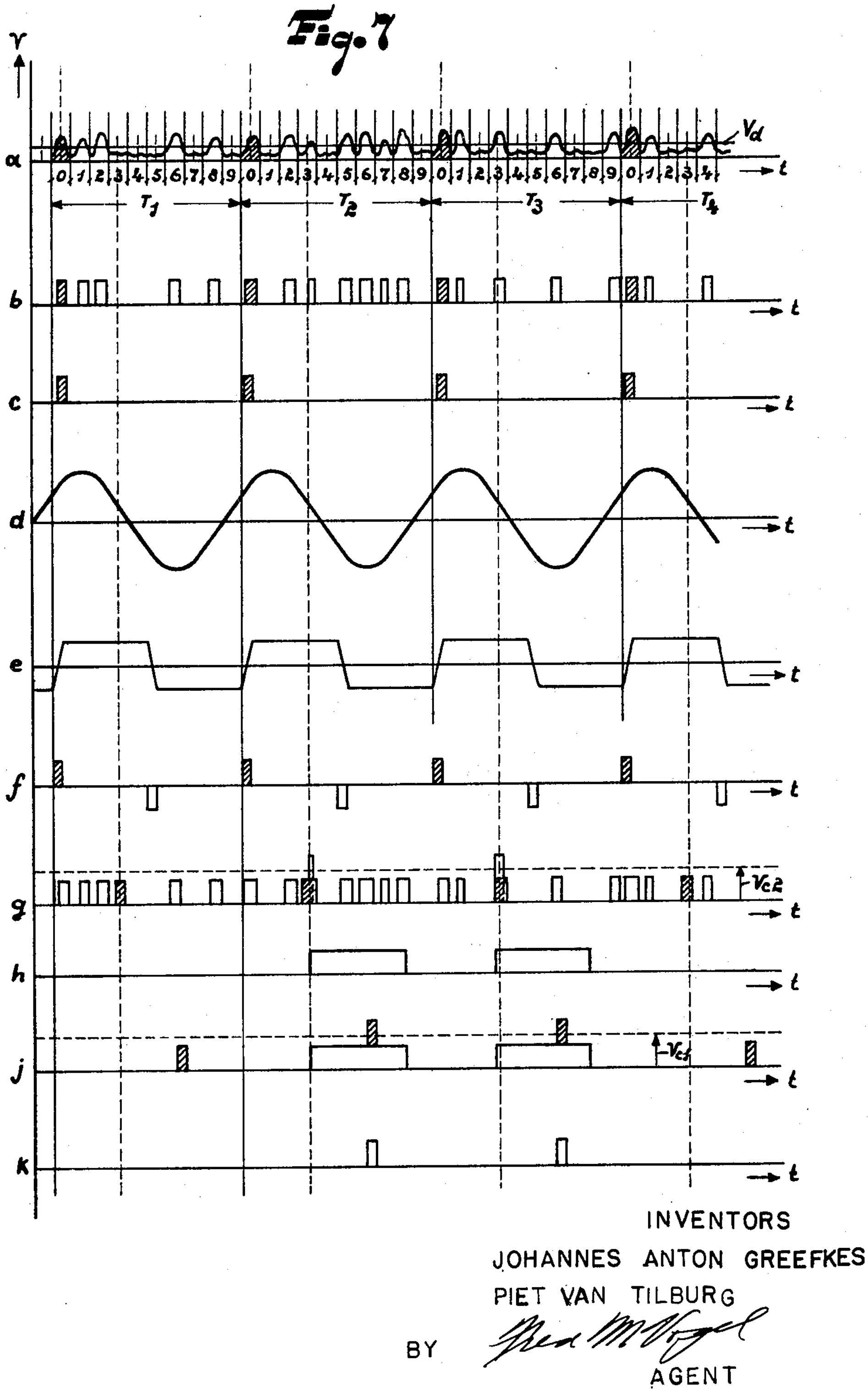

In order that the invention may be readily carried into effect, it will now be described in greater detail with reference to the accompanying diagrammatic drawings, given by way of example, in which:

Fig. 1 is a time diagram of pulses produced by a 9+1 channel time multiplex transmitter in a system of the aforesaid type used in signal transmission by means of a one unit code (so-called quantum-modulation), Fig. 2 is a block diagram of a receiver comprising an arrangement according to the invention for receiving the pulse trains shown in Fig. 1, Fig. 3 is a block diagram of an improved receiver comprising an arrangement according to the invention, Fig. 4 shows a synchronisation pulse selector for use in the receiver shown in Fig. 2 or 3, Fig. 5 shows a synchronisation pulse regenerator for use preferably in the receiver shown in Fig. 3, Fig. 6 shows an individual receiving channel of the receiver shown in Fig. 3, and Fig. 7 shows time diagrams (*a* to *k*) with reference to which the operation of the receiver shown in Figs. 2 and 3 will be explained.

The time diagram of Fig. 1 shows a few cycles of pulses produced by a 9+1 channel time multiplex transmitter for signal transmission with quantum-modulation. $T_1$, $T_2$, $T_3$ and $T_4$ represent successive signal cycles each subdivided into ten equal intervals. The first interval is designated 0 and intended for synchronisation pulses $P_{01}$, $P_{02}$, $P_{03}$, $P_{04}$ and so forth (shown shaded). The remaining intervals in each signal cycle are consecutively numbered from 1 to 9 and are intended for pulses belonging to nine different signal channels. $P_{31}$, $P_{32}$, $P_{33}$ and $P_{34}$ denote four signal intervals of the third signal channel, pulses $P_{31}$ and $P_{34}$ being suppressed as shown by broken lines. Pulses $P_{61}$, $P_{62}$ and $P_{63}$ of the sixth signal channel are present in each of the three signal cycles $T_1$ to $T_3$ represented. Such trains of signal pulses for signal transmission with quantum modulation may be produced per signal channel with the use of the transmitters described in U. S. Patent No. 2,662,118, issued December 8, 1953, and in U. S. patent application Serial No. 216,486, filed March 20, 1951.

In relation to shape, duration and amplitude there is no difference between the signal pulses and the synchronisation pulses. The synchronisation pulses are distinguished by their continuous presence, i. e., each signal cycle comprises a synchronisation pulse during the time interval designated 0. Pulses of a particular signal channel are alternatively present or absent in accordance with the signal to be transmitted through the channel in question.

Of the pulse train shown in Fig. 1 all pulses transmitted coincide with pulses of a series of equispaced pulses. The recurrence frequency of the synchronisation pulses and the signal cycle frequency may, for example, be 50 kcs./sec. and the duration of the pulses transmitted may be 1$\mu$ sec. the maximum recurrent frequency of the pulses transmitted then being 500 kcs./sec.

At the receiver, however, the pulses produced at the transmitter no longer have the shape, amplitude and duration shown in Fig. 1. For example, the pulses shown in Fig. 1 will, after transmission, be shaped as shown in the time diagram of Fig. 7*a*, where not only the amplitude and the shape of the pulses but also their relative spacing is different. This may be seen at the receiver since the incoming pulses exceed a given threshold value $V_d$ at non-equispaced instants. Reduction of the noise caused by mutilation and time displacement of the pulses requires special steps to be taken at the receiver end.

Fig. 2 shows a simple receiver, for receiving pulse trains as shown in Fig. 7*a*, in which the pulses picked up by an aerial 10 are supplied to an amplification stage 11 which may successively comprise a high-frequency amplifier, a mixer stage, an intermediate-frequency amplifier, an amplitude detector and an amplitude limiting and threshold arrangement. The pulses taken from the detector have a shape as shown in Fig. 7*a* and, after passing through the threshold arrangement and the limiter approximately at the level designated $V_d$ in Fig. 7*a*, they have a shape as shown in Fig. 7*b*. All the pulses shown in Fig. 7*b* have the same amplitude, but their leading edges are not equispaced and the duration of all the pulses is not equal.

The signal and synchronisation pulses taken from the amplification stage 11 are supplied to a synchronisation pulse selector 12, one construction of which will be described with reference to Fig. 4. In the output circuit of the synchronisation pulse selector 12 only the synchronisation pulses of Fig. 7*b* occur; they are shown in Fig. 7*c*. The synchronisation pulse selector is preferably such that all the pulses taken therefrom are of the same duration. Due to interference, however, their relative times of occurrence are not such that they are equispaced.

In order to mitigate this drawback which causes noise in the incoming signals, the selected synchronisation pulses are supplied to a synchronization pulse regenerator, or noise suppressing device 13, of which only the block diagram is shown in Fig. 2. As a possible detailed construction reference is made to the description thereof in U. S. Patent No. 2,662,118, issued December 8, 1953.

The noise suppressing device comprises a local oscillator 14 which supplies a sinusoidal oscillation and is tuned to a frequency corresponding substantially to the recurrence frequency of the incoming synchronisation pulses. The sinusodial oscillation of oscillator 14, together with the synchronisation pulses occurring at the output of the synchronisation pulse selector 12, is supplied to a phase detector consisting of a mixer stage 15. Across the output circuit of this mixer stage a control direct voltage is set up, which depends upon the phase of the synchronisation pulses in relation to the sinusoidal oscillation. After having been smoothed by means of a low-pass filter 16, the said control direct voltage controls a reactance tube 17 coupled to the frequency-determining circuit of oscillator 14. In this manner the frequency and phase of the local oscillator 14 are automatically stabilized on the recurrence frequency of the synchronisation pulses. The synchronisation pulses supplied to the regenerator 13 exhibit considerable phase variations, but these will not occur, or at least be materially reduced, in the sinusodal output voltage of oscillator 14, provided the time constant of the smoothing filter 16 be given a sufficient value, for example such that the cut-off frequency is at the most $\frac{1}{100}$ to $\frac{1}{500}$ of the recurrence frequency of the synchronisation pulses. The sinusoidal oscillation of oscillator 14 thus being comparatively stable in phase is supplied through an amplitude limiting and threshold arrangement 18 (slicer) to a differentiating network 19, the output circuit of which comprises a series-connected diode and a parallel resistance for suppressing pulses of negative polarity. In the output circuit of the differentiating network 19 then occur pulses of positive polarity and of a recurrence frequency substantially accurately corresponding to the average recurrence frequency of the incoming synchronisation pulses, but, as distinguished from the last-mentioned pulses, substantially without time-displacement noise.

The pulses obtained are utilised for replacing the incoming signal pulses and are supplied by way of a lead 20, to a delay cable 21, to different tapping points of which are connected first coincidence mixer stages located in the individual receiving channels $A_1$ to $A_9$. The receiving channels $A_1$ to $A_9$ are similar. Only the coincidence mixer stage of channel $A_1$ is shown in the block diagram thereof and denoted 22. To the coincidence mixer stage 22 are moreover supplied all incoming pulses, if desired after convenient lengthening, which occur at the output of amplification stage 11. In the output circuit of mixer stage 22 pulses occur only if at the mixer stage 22 an incoming pulse and a substitution pulse taken from the delay cable 21 coincide. Due to interference in the transmission path, the incoming pulses were different in relation to amplitude, duration and shape and, moreover, displaced in time of occurrence, but the pulses set up in the output circuit of coincidence mixer stage 22 substantially no longer suffer from these transmission faults. Moreover, by a suitable choice of the tapping from the delay cable 21, there will occur only those signal pulses in the output circuit of mixer stage 22 in channel $A_1$ of the signal interval designated 1 in Figs. 1 and 7. During the remaining signal intervals, no substitution pulses are supplied through the delay cable 21 to the mixer stage 22. Hence, the latter cannot supply output pulses, so that the aforesaid means also effect the distribution of the signal pulses between the individual receiving channels $A_1$ to $A_9$.

The pulses of the time intervals 1 occurring in the output circuit of coincidence mixer stage 22 are supplied, through a pulse widener 23, to a signal frequencies integrating network 24, across the output circuit of which the transmitted signal occurs. In order to remove the pulse recurrence frequency and higher harmonics thereof, the output signal of the integrating network 24 is supplied to a loudspeaker 26 through a low-pass filter 25 and, if desired, through an amplifier.

In this respect it is to be noted that for noise-elimination in a proposed pulse-code modulation receiver, all incoming pulses were supplied to a regenerator similar to that shown at 13, which was tuned to the maximum recurrence frequency (500 kcs./sec. in Fig. 1) of the incoming pulses. Since the incoming pulses per channel are alternatively present and absent in accordance with the signals to be transmitted, the control voltage produced in the regenerator 13 then comprises signal voltage components and consequently troublesome cross-talk through the noise-suppression device. In the receiver shown in Fig. 2, such cross-talk can substantially not be introduced by the regenerator 13, since the signal pulses are not supplied thereto. Cross-talk could still occur if, for example due to parasitic reflections or the like, band width limitations, damping phenomena in oscillatory circuits and so on, the trailing edges of the signal pulses were to extend into the synchronisation interval. By a suitable construction of the apparatus, this cross-talk, which decreases with the time spacing between the synchronisation interval and a preceding signal interval, can easily be reduced to a permissible value.

In the receiver shown in Fig. 2, the variation of the phase displacement between the pulses supplied to the regenerator 13 and the regenerated pulses derived therefrom should remain smaller than approximately ⅓ of a signal interval. A greater variation of this phase displacement would cause pulses, for example intended for signal channel $A_2$, to reach the immediately preceding channel $A_1$ or the next succeeding channel $A_3$. In practice, it is objectionable to maintain such a small tolerance with respect to the phase displacement in the regenerator 13, notably if the recurrence frequency of the synchronisation pulses is not maintained perfectly constant at the transmitter.

These difficulties may be further reduced with the receiver shown in Fig. 3.

In Fig. 3, the incoming pulses picked up by the aerial 10 are again supplied, by way of the amplification stage 11 comprising inter alia a detector, to the synchronisation pulse selector 12. The selected synchronisation pulses control a regenerator 27, the details of which will be described with reference to Fig. 5. The regenerated pulses occurring in the output lead 20 are supplied, to a first delay cable 21, suitable tapping points of which are connected to the inputs of first coincidence mixer stages located in the individual, similar receiving channels $A_1$ to $A_9$ respectively. Of these coincidence mixer stages only the stage denoted 28 of signal channel $A_3$ is shown in any detail. The output pulses of the coincidence mixer stage 28 are supplied to an integrating network 29 and the signal voltage obtained therefrom is supplied to a loudspeaker 31 by way of a low-pass filter 30.

Besides the pulses taken from the delay cable 21, further pulses derived from the incoming pulses are supplied to the first coincidence mixer stage 28. Synchronisation pulses occurring in the output circuit of selector 12 are supplied to a second delay cable 32, to suitable tapping points of which are connected second coincidence mixer stages, for example 33 in channel $A_3$, situated in the individual receiving channels. Moreover, all incoming pulses are supplied in parallel connection to inputs of the said second coincidence mixer stages, but these second coincidence mixer stages supply output pulses only if a pulse supplied thereto through the second delay cable 32 coincides with an incoming pulse. Consequently, the second coincidence mixer stages effect the distribution of the signal pulses received in time-division multiplex between the individual receiving channels $A_1$ to $A_9$. The output pulses of the second coincidence mixer stages 33 are supplied by way of a pulse expander 34 to an input of the first coincidence mixer stage 28.

Fig. 4 is a more detailed diagram of a synchronisation pulse selector which it is preferred to use in the receivers shown in Figs. 2 and 3, which selector is denoted 12 in Figs. 2 and 3. It is assumed that pulses similar to those shown in Fig. 7*b* are supplied to the said selector. The synchronisation pulses are shaded in Fig. 7*b*. The pulses supplied to the selector are assumed to be of negative polarity.

The selector shown in Fig. 4 comprises a trigger circuit including two pentodes 35, 36 having a common cathode resistor 37. The control grid of pentode 35 is connected to the end, remote from the cathode, of cathode resistor 37, so that it has a high negative bias. The control grid of pentode 36 is connected by way of a grid resistor 38 to the anode voltage lead 39 (for example, +250 volts) and to the anode of a grid voltage limiting diode 40, the cathode of which is connected to a variable voltage divider comprising resistors 41 and 42 and being connected between the earth lead 43 and the anode voltage lead 39. The control grid of pentode 36 normally has a potential substantially corresponding to the potential of the associated cathode. Since the control grid of pentode 35 is highly biassed negatively, the pentode 36 will normally be conductive and pentode 35 will be cut off. In this state of equilibrium of the trigger circuit, the anode of pentode 35 is at a high positive potential, with the result that a diode 45 connected thereto is conductive and the cathode of which diode is maintained at a suitable positive potential by means of a voltage divider arranged in parallel with the source of anode voltage and comprising a resistor 46 and a glow discharge tube 47. The cathode of the diode 45 is connected through a resistor 48 to a tapping (for example approximately 150 volts) of the last-mentioned voltage divider.

In the aforesaid state of equilibrium of the trigger circuit, incoming pulses of negative polarity supplied to input terminals 49 will be supplied to the control grid of pentode 36 through the diode 45 and a coupling capacitor 50 located between the anode of pentode 35 and the control grid of pentode 36, with the result that pentode 36 is cut off and pentode 35 becomes conductive. Owing to the pentode 35 becoming conductive, its anode acquires a low positive potential such that the diode 45 connected to this anode is cut off and further impulses supplied to the input terminals cannot influence the crosswise coupled pentodes 35 and 36.

After a lapse of time dependent upon the time constant of the trigger circuit including pentodes 35 and 36, the circuit will flip back into its initial state of equilibrium, in which the pentode 36 is conductive and pentode 35 is cut off. On flipping back into this initial state of equilibrium, the diode 45 becomes conductive so that a next following incoming pulse will cause the trigger circuit to respond. The time constant of the trigger circuit is chosen such that, after having responded to an incoming pulse, it remains insentitive during a time smaller than one signal cycle, for example $T_1$, and greater than this signal cycle less one signal interval. If the trigger circuit in the signal interval $T_1$ shown in Fig. 1 were to respond, for example, to the signal pulse in the interval 8 it will remain insensitive up to just before the occurrence of the signal pulse in the time interval 8 of signal cycle $T_2$ and will subsequently respond to a signal pulse 8 present in the signal cycle $T_2$. The selector will now again become insensitive up to just before the interval 8 of signal cycle $T_3$, but in this case it cannot respond during this interval 8 owing to the absence of the signal pulse in question, due to which the trigger circuit then responds to the signal pulse of interval 9 in signal cycle $T_3$. In this event, the circuit arrangement remains responsive to pulses in the signal interval 9 until this pulse also is once absent, whereupon it responds to the synchronisation pulses from interval 0 of the signal cycles. Since, as stated above, the synchronisation pulses occur in each signal cycle, the circuit arrangement will subsequently remain responsive to these synchronisation pulses, so that the trigger circuit comprising pentodes 35, 36 will flip over whenever a synchronisation pulse is received. In this manner the synchronisation pulses are selected. Each time the pentode 36 is cut off by a synchronisation pulse, a voltage pulse occurs in the anode circuit of this pentode, thus shock-exciting an oscillatory circuit including a coil 51, a capacitor 52 and an attenuation resistor 53 located in the anode circuit thereof. The said oscillatory circuit imparts by way of coupling capacitor 54 a positive voltage pulse of a duration determined by the natural frequency of the oscillatory circuit 51, 52 to the control grid of a pentode amplifier 55 which is normally cut off by a negative grid bias taken from a voltage divider 56 connected between the earth lead 43 and a negative voltage lead 44. The anode lead of pentode 55 comprises an output transformer 57, a diode 58 being connected in parallel with the secondary winding thereof to suppress pulses of negative polarity. Consequently, a positive pulse of particular duration coinciding with the synchronisation pulses of Fig. 7*b*, occurs at output terminals 59, connected to the secondary winding of the output transformer 57, on reception of each synchronisation pulse. The synchronisation pulses thus selected are shown in the time diagram of Fig. 7*c*.

Fig. 5 represents a synchronisation pulse regenerator, which it is preferred to use in the receiver shown in Fig. 3. Herein, the synchronisation pulses occurring at the output terminals 59 (Fig. 4) of the synchronisation pulse selector, are supplied to input terminals 60 of an input transformer 61. To the secondary winding of this input transformer is connected a filter network of a type known per se, which comprises four crystals 62 and is tuned to the recurrence frequency of the synchronisation pulses. The output circuit of the said filter network includes a transformer 63.

When the selected synchronisation pulses shown in Fig. 7*c* are supplied to crystal filter 62, a sinusoidal voltage as shown in Fig. 7*d* will be set up across the output circuit of the said filter, the phase of this voltage will, provided the filter has a high Q (for example 500 to 1000, as is readily attainable with crystals, vary only very slightly with the instantaneous phase of the fundamental frequency of the synchronisation pulses supplied. Owing to the use of the high grade crystal filter, the phase of the sinusoidal output voltage of the filter will be determined by the phase of the input pulses, averaged over, say, at least 500 cycles of the recurrence frequency of the input pulses. Consequently, the phase of the input pulses in cycles immediately succeeding each other will be subject to variations due to interference in the transmission path, but these phase variations occur strongly attenuated in the output circuit of the crystal filter.

The secondary winding of transformer 63, across which the sinusoidal oscillation of Fig. 7*d* occurs, is connected in the control-grid circuit of a pentode 64 having an anode circuit 65 tuned to the frequency of the sinusoidal oscillation. The anode circuit 65 comprises a capacitor 66 and an iron-cored coil 67 having a self-inductance which depends upon the anode current of pentode 64 and is utilised for readjusting the tuning frequency of the anode circuit 65 in order to establish a particular desired phase relationship between the grid and anode alternating voltage of pentode 64.

To convert the anode alternating voltage of pentode 64 into a substantially rectangular voltage, it is supplied to a trigger circuit (slicer) of a type known per se comprising two cross-coupled triodes 67, 68.

The triodes 67, 68 have a common cathode resistor 69 and anode resistors 70 and 71, respectively. Through a germanium cell 72 the control grid of triode 67 is connected to the earthed end of cathode resistor 69, a negative bias being applied to the control grid of triode 68 by way of a germanium cell 73. A coupling capacitor 74 is connected between the anode of triode 67 and the control grid of triode 68.

As is known, the trigger circuit described has the property that a sinusoidal alternating voltage supplied thereto through an input capacitor 75 is sliced. In accordance with the potential impressed on the input control grid, the trigger circuit assumes one or the other of two states of equilibrium. At an input potential exceeding a particular value, the triode 67 is conductive and triode 68 is cut off. At a lower potential of the input control grid, the trigger circuit is in the other state of equilibrium, wherein triode 67 is off and triode 68 is conductive. With the use of germanium cells in the triode control grid circuits, the working point of the trigger circuit adjusts itself automatically to a suitable value, the limiting potentials being only slightly different.

When supplying a sinusoidal voltage to the input control grid of the trigger circuit the triode 68 is alternately cut off and conductive, so that a voltage of the shape depicted in Fig. 7*e* is set up across the anode resistor 71 of the triode 68. The substantially rectangular voltage is supplied through a differentiating network comprising a capacitor 76 and a resistor 77 to the control grid of a pentode 78 which, by connecting the control grid through a grid resistor 79 to a negative source of grid bias, is biassed such that the pentode 78 is normally cut off. At the output resistor 77 of the differentiating network 76, 77 positive and negative pulses alternately occur, as shown in Fig. 7*f*, of which only the positive pulses (shaded in Fig. 7*f*) cause anode current to flow in the pentode 78. The anode circuit of pentode 78 comprises an output transformer 80. Each time a pulse of positive polarity is supplied to the control grid of the pentode 78, a positive and a negative pulse occur across the secondary winding of the output transformer 80, the negative pulse being suppressed by a rectifier cell 81, so that pulses of positive polarity occur at output terminals 82 connected to the secondary winding.

As stated above, the variations of phase displacement between input and output pulses of the synchronisation pulse regenerator should not be excessive in connection with the practical construction of the receiver shown in Fig. 3. If allowance must be made for relative variation of the recurrence frequency, fixed at the transmitter, of the synchronisation pulses and the tuning frequency of the crystal filter 62 in the synchronisation pulse regenerator of the receiver (Figs. 5 and 3), the said phase variations between the input and output pulses of the synchronisation pulse regenerator should be prevented from attaining an excessive value due to the high selectivity of crystal filter 62. This is ensured by providing the synchronisation pulse regenerator shown in Fig. 5 with means for automatic phase-correction of the output pulses in relation to the input pulses. To this end the input pulses occurring at the output terminals 82 are supplied by way of a coupling capacitor to the control grid of a pentode 83 with an integrating network 84 included in the anode circuit. The pentode 83 is normally cut off by connecting the control grid to a tapping of a voltage divider comprising resistors 85, 86 and being connected in parallel with a source of negative grid bias. Whenever a positive pulse is supplied to the pentode 83, an anode current pulse occurs therein with the result that a capacitor 87 of the integrating network 84 is charged. Between succeeding pulses, the pentode 83 is cut off and the charge of integration capacitor 87 decreases gradually. The time constant of the integrating network 84 is so chosen that the integration capacitor 87 is only partially discharged between two succeeding input pulses of pentode 83. In this manner a sawtooth voltage having a fundamental frequency corresponding to the recurrence frequency of the pulses supplied to pentode 78 is set up across the integrating network 84.

The sawtooth voltage set up at the anode of pentode 83 is supplied, by way of a coupling capacitor 88 and a decoupling resistor 89, to an input resistor 90 of a circuit comprising a diode 91 and acting as a peak detector. The input pulses to input terminal 60 supplied to the synchronisation pulse regenerator are supplied to the input resistor 90 of the detector circuit through a coupling capacitor 92 and a decoupling resistor 93. In order to bias the detector circuit, the input resistor 90 is connected through a resistor 94 to the negative terminal 95 of a source of grid bias.

Across the input resistor 90 of the detector circuit the sawtooth voltage from the integrating network 84 and the input pulses of the regenerator are added, so that a voltage dependent upon the phase-relation of sum voltage set up across the input resistor 90 appears in the output circuit of the detector. The output circuit of the detector comprises a low-pass filter with series-resistors 96, 97 and parallel capacitors 98 and 99, the latter being shunted by a resistor 100. The output voltage of the detector circuit has a positive polarity and is supplied through a resistor 101 to the control grid circuit of pentode 64, together with a negative grid bias supplied thereto through a variable resistor 102, owing to which the total grid bias of pentode 64 depends upon the phase relation existing between the input and output pulses of the synchronisation pulse regenerator. Upon a variation of the phase relation of input and output pulses, the grid bias of pentode 64 and consequently its anode current and the tuning of anode circuit 65 vary such that the said phase variation is counteracted and a particular desired phase relation between input and output pulses of the regenerator can be accurately maintained to within a few degrees. The desired phase relation can be adjusted by adjustment of resistor 102 in the grid circuit of pentode 64, thus establishing, for example, the phase relation shown in Figs. 7c and 7f between input and output pulses of the regenerator.

Fig. 6 shows a preferred form of the channel unit $A_3$ of the receiver shown in Fig. 3.

To an input terminal 103 of this channel unit, pulses are supplied from a tapping of delay cable 32 shown in Fig. 3, the input of which is connected to the output of the synchronisation pulse selector 12. The pulses taken from the synchronisation pulse selector are shown in Fig. 7c, the pulses obtained therefrom after retardation and supplied to input terminal 103 are shown shaded in Fig. 7g. Through a coupling capacitor 104 these pulses are supplied to the control grid of a pentode 105 which is used as a coincidence mixer stage and is normally cut off by a suitable bias. The control grid circuit furthermore comprises a variable parallel capacitor 106 in order that the capacity occurring between the input terminal 103 and earth may be adjusted to the value desired in relation to the delay cable 32.

The circuit shown in Fig. 6 comprises a second input terminal 107 which is connected to the output of the amplification stage 11 in the receiver shown in Fig. 3. Through the input terminal 107 all incoming pulses i. e. signal and synchronisation pulses are thus supplied to the circuit shown in Fig. 6 and more particularly to a detector circuit comprising a diode 108, a parallel resistor 109 and an input capacitor 110. When pulses of positive polarity are supplied to input terminal 107 a negative bias is set up across resistor 109, which bias together with the positive pulses, occurs at the suppressor grid of pentode 105. Owing to the negative bias applied to the suppressor grid and the negative bias applied to the control grid, anode current flows in the anode circuit of the pentode only if pulses of positive polarity simultaneously occur at the input terminals 103 and 107.

Besides the aforesaid shaded pulses, Fig. 7g shows the pulses supplied to input terminal 107. In the voltage-time diagram of Fig. 7g both pulse trains supplied are superposed. Only if, in the diagram of Fig. 7g, the pulses jointly exceed a particular threshold value $V_{c2}$, does an output pulse occur across an anode resistor 111 of pentode 105.

In the circuit arrangement shown in Fig. 6, these output pulses are supplied to a multivibrator comprising triodes 112 and 113 and acting as a pulse expander. Such a pulse expander (flip-flop circuit) is known per se. The triodes 112 and 113 are crosswise coupled, i. e. through a coupling capacitor 114 connected between the anode of triode 112 and the control grid of triode 113 and through a voltage divider comprising a resistor 115 which is placed between the anode of triode 113 and the control grid of triode 112 and connected to the negative grid bias lead through a resistor 116. The control grid of triode 113 is connected to the anode voltage lead 118 through a grid resistor 117, so that the triode 113 is conductive in the absence of control pulses. As soon as a pulse of negative polarity appears at the anode resistor 111 of pentode 105, it is impressed through the coupling capacitor 114 on the control grid of triode 113, thus cutting off triode 113 and rendering triode 112 conductive. After a duration determined inter alia by the values of the capacitor 114 and the resistor 115, the circuit resumes its initial state of equilibrium the triode 113 again becoming conductive and triode 112 being cut off.

The pulses exceeding the threshold value $V_{c2}$ in Fig. 7g thus cause the multivibrator to respond, so that the lengthened pulses shown in Fig. 7h occur across an anode resistor 119 of the multivibrator, the leading edge of these pulses coinciding with the instants at which the pulses of Fig. 7g exceed the threshold voltage $V_{c2}$.

The lengthened pulses occurring across the anode resistor 119 have a positive polarity and are supplied, through a detector circuit comprising a diode 120, a parallel resistor 121 and an input capacitor 122 to the suppressor grid of a pentode 123 which is used as a coincidence mixer stage. With the use of the said detector circuit, the suppressor grid of pentode 123 acquires a negative bias sufficient to cut off completely the anode current of pentode 123 in the interval between the lengthened pulses. With the use of a voltage divider comprising resistors 124, 125, the control grid of pentode 123 is also negatively biassed such that anode current will flow in the pentode 123 only during the pulses of positive polarity supplied thereto. Through a coupling capacitor 126 and input terminal 127 the control grid is connected to a suitable tapping of delay cable 21 (Fig. 3), the input of which is connected to the output of pulse regenerator 27 shown in Fig. 3. In this manner substantially noise-free pulses are supplied to the input terminal 127, which pulses have been obtained by retardation of the positive pulses shown in Fig. 7f and are shown shaded in Fig. 7j. Fig. 7j also shows the lengthened pulses supplied to the suppressor grid of pentode 123. Only when the pulses supplied by way of input terminal 127 coincide with the lengthened pulses supplied to the suppressor grid of pentode 123, will anode current flow in pentode 123. In Fig. 7j this is indicated by a threshold value $V_{c1}$ which the superposed pulses must exceed for causing anode current to flow. The anode current pulses thus produced are shown in Fig. 7k.

The anode circuit of pentode 123 comprises a signal-frequencies integrating network 128 across which occurs the signal voltage transmitted in the third interval of the cycles. This signal voltage is applied to a loudspeaker 131 by way of a transformer 129 and a low-pass filter 130 for suppressing the pulse recurrence frequency and higher harmonics thereof. In the circuit shown in Fig. 6, the coincidence mixer stage comprising the pentode 105 effects the selection of the pulses occurring in a particular signal interval from the pulses received in time-multiplex. This selection permits in the channel unit shown in Fig. 6 and after the coincidence mixer stage 105 the selected signal pulses to be lengthened to a duration materially exceeding that of one signal interval. In this case, substitution of these lengthened pulses, the leading edges of which exhibit time displacements caused by transmission interference and consequently have a certain noise component, by substantially noise-free pulses is extremely simple, since the considerable duration of the lengthened pulses permits a considerable phase variation of the substantially noise-free pulses superposed thereon, which is not the case with the receiver shown in Fig. 2. These permissible great phase variations thus permit the tolerance requirements imposed on transmitter and receiver to be materially reduced, so that both the transmitter and receiver become cheaper, in spite of the necessity of using an additional delay cable and an additional coincidence mixer stage.

It will be obvious that receivers comprising an arrangement according to the invention may also be used for signal transmission by pulse-code modulation with the use of a multi-unit code.

What we claim is:

1. In a time-multiplex pulse-code modulation signal-transmission system wherein successive trains of signal pulses are transmitted, each train having a like number of pulse intervals and being preceded by a synchronization pulse; a receiver for regenerating said transmitted pulses both in form and time of occurrence and for distributing them in cyclical sequence; said receiver comprising a synchronization pulse selector responsive to the received pulses for separating the synchronization pulses from the trains of pulses, a synchronization pulse regenerator comprising an input filter tuned to the repetition frequency of said synchronization pulses, an amplitude limiter coupled to the output of said filter, and a differentiating network coupled to the output of said limiter, a delay network coupled to the output of the differentiating network in said regenerator and having a series of spaced taps each yielding substitution pulses, and a plurality of receiving channels corresponding in number to the number of intervals in a train, each channel including a coincidence mixer, means to supply the received pulses and the substitution pulses derived from a respective tap of said delay network to the input of said mixer, and means to derive the separated and regenerated signal pulses from the output of said mixer.

2. A receiver, as set forth in claim 1, further including a controllable phase corrector interposed between said input filter and said limiter, means to mix the input and output pulses of said regenerator to produce a control voltage, and means including a low-pass filter to apply said control voltage to said phase corrector.

3. In a time-multiplex pulse-code modulation signal-transmission system wherein successive trains of signal pulses are transmitted, each train having a like number of pulse intervals and being preceded by a synchronization pulse; a receiver for regenerating said transmitted pulses both in form and time of occurrence and for distributing them in cyclical sequence; said receiver comprising a synchronizing pulse selector responsive to the received pulses for separating the synchronization pulses from the trains of pulses, a synchronization pulse regenerator coupled to the output of the selector, a first delay network coupled to the output of said regenerator and having a series of spaced taps to yield substitution pulses, a second delay network coupled to the output of said selector and having a series of spaced taps, and a plurality of receiving channels corresponding in number to the number of intervals in a train, each channel including first and second coincidence mixers, means to supply the received pulses and the pulses yielded at a respective tap of said second delay network to the input of said second mixer, and means to supply the pulses yielded by said second mixer and the substitution pulses yielded at a respective tap of said first delay network to the input of said first mixer to produce regenerated signal pulses.

4. A receiver, as set forth in claim 3, wherein said receiving channel further includes a pulse expander interposed between the output of said second mixer and the input of the first mixer.

5. A receiver, as set forth in claim 3, wherein said receiving channel further includes an amplitude threshold and limiter circuit for supplying the received pulses to the input of said second mixer.

6. A receiver, as set forth in claim 3, wherein said receiving channel further includes an intergrating network coupled to the output of said second mixer to integrate the regenerated signal pulses, a reproducer, and a low-pass filter coupling the output of said integrating network to said reproducer.

7. In a time-multiplex pulse-code modulation signal-transmission system wherein successive trains of signal pulses are transmitted, each train having a like number of pulse intervals and being preceded by a synchronization pulse; a receiver for regenerating said transmitted pulses both in form and time of occurrence and for distributing them in cyclical sequence, said receiver comprising means to detect the received pulses, a synchronization pulse selector coupled to said detection means to separate the synchronization pulses from the trains of pulses, a synchronization pulse regenerator coupled to the output of the selector, first and second delay networks each having a series of spaced taps therein, said first network being coupled to the output of said regenerator and yielding substitution pulses at said taps, said second network being coupled to the output of said selector, and a plurality of receiving channels equal in number to said number of intervals in a train, each channel including first and second coincidence mixers, means to supply the pulses yielded in the output of said detection means and the pulses emerging from a respective tap on said second network to the input of said second mixer, means to supply the pulses produced by said second mixer and the substitution pulses yielded at a respective tap of said first delay network to the input of said second mixer to produce regenerated signal pulses, and means to integrate said regenerated signal pulses to recover said signal.

References Cited in the file of this patent

UNITED STATES PATENTS

| | | |
|---|---|---|
| 2,403,561 | Smith | July 9, 1946 |
| 2,414,265 | Lawson | Jan. 14, 1947 |
| 2,449,467 | Goodall | Sept. 14, 1948 |
| 2,537,056 | Hoeppner | Jan. 9, 1951 |
| 2,565,479 | Cruikshank | Aug. 28, 1951 |